US010362488B2

(12) United States Patent
McMenamy et al.

(10) Patent No.: US 10,362,488 B2
(45) Date of Patent: Jul. 23, 2019

(54) METHOD AND SYSTEM FOR COMPUTING BANDWIDTH REQUIREMENT IN A CELLULAR NETWORK

(71) Applicant: The Provost, Fellows, Foundation Scholars and the other members of Board, of the College of the Holy and Undivided Trinity of Queen Elizabeth Near Dublin, Dublin (IE)

(72) Inventors: Jasmina McMenamy, Dublin (IE); Irene Macaluso, Dublin (IE); Linda Doyle, Dublin (IE)

(73) Assignee: THE PROVOST, FELLOWS, FOUNDATION SCHOLARS AND THE OTHER MEMBERS OF THE BOARD, OF THE COLLEGE OF THE HOLY AND UNDIVIDED TRINITY OF QUEEN ELIZABETH NEAR DUBLIN, Dublin (IE)

( * ) Notice: Subject to any disclaimer, the term of this patent is extended or adjusted under 35 U.S.C. 154(b) by 0 days.

(21) Appl. No.: 15/764,265

(22) PCT Filed: Sep. 28, 2016

(86) PCT No.: PCT/EP2016/073148
§ 371 (c)(1),
(2) Date: Mar. 28, 2018

(87) PCT Pub. No.: WO2017/055369
PCT Pub. Date: Apr. 6, 2017

(65) Prior Publication Data
US 2018/0279131 A1 Sep. 27, 2018

(30) Foreign Application Priority Data

Sep. 28, 2015 (GB) .................................. 1517121.8

(51) Int. Cl.
*H04W 72/00* (2009.01)
*H04W 16/14* (2009.01)
(Continued)

(52) U.S. Cl.
CPC ........... *H04W 16/14* (2013.01); *H04W 24/08* (2013.01); *H04B 17/336* (2015.01); *H04L 43/0888* (2013.01); *H04W 84/042* (2013.01)

(58) Field of Classification Search
CPC ... H04W 16/14; H04W 24/08; H04W 17/336; H04W 84/042; H04W 72/04; H04W 16/10; H04L 43/0888
(Continued)

(56) References Cited

U.S. PATENT DOCUMENTS 9,621,476 B2 * 4/2017 Gopinathan ........ H04L 43/0876
2011/0047287 A1 * 2/2011 Harrang .................. H04L 45/00
709/235
(Continued)

OTHER PUBLICATIONS

International Search Report received in PCT/EP2016073148, dated Apr. 6, 2017, 5 pages.
(Continued)

*Primary Examiner* — Danh C Le
(74) *Attorney, Agent, or Firm* — ARC IP Law, PC; Joseph J. Mayo

(57) ABSTRACT

Provided a method and system for computing a bandwidth requirement for a cellular operator from shared spectrum in a cellular network, the shared spectrum comprising at least one shared spectrum class which is accessible by multiple entities, the method comprising: computing an average user throughput in the cellular network; comparing the average user throughput to a target minimum average user throughput, taking into account an average percentage of users within coverage and a coverage probability threshold; and based on the comparison, computing an additional band-
(Continued)

width requirement from the at least one shared spectrum class.

29 Claims, 10 Drawing Sheets

(51) Int. Cl.
*H04W 24/08* (2009.01)
*H04B 17/336* (2015.01)
*H04L 12/26* (2006.01)
*H04W 84/04* (2009.01)

(58) Field of Classification Search
USPC .................................. 455/454, 452.2, 452.1
See application file for complete search history.

(56) References Cited

U.S. PATENT DOCUMENTS

| 2011/0131319 | A1* | 6/2011 | Harrang | H04L 47/11 |
| | | | | 709/224 |
| 2011/0256897 | A1* | 10/2011 | Taoka | H04B 7/0615 |
| | | | | 455/509 |
| 2013/0088955 | A1* | 4/2013 | van den Berg | H04L 47/2433 |
| | | | | 370/230 |
| 2013/0250766 | A1* | 9/2013 | Chaudhuri | H04W 72/1242 |
| | | | | 370/235 |
| 2014/0274104 | A1 | 9/2014 | Amanna et al. | |
| 2016/0261516 | A1* | 9/2016 | Gopinathan | H04L 43/0876 |
| 2016/0291882 | A1* | 10/2016 | Wakhare | G06F 3/0613 |
| 2018/0034669 | A1* | 2/2018 | Barbieri | H04L 25/02 |

OTHER PUBLICATIONS

McMenamy, et al., "A framework for enhanced carrier aggregation with dynamic carrier selection", 2013 IFIP Wireless Days, Nov. 1, 2013, pp. 1-6.

McMenamy, et al., "A methodology to help operators share the spectrum through an enhanced form of Carrier Aggregation", 2014 IEEE International Symposium on Dynamic Spectrum Access Networks, Apr. 1, 2014, pp. 334-345.

Doyle, et al., "Regulating for carrier aggregation and getting spectrum management right for the longer term", Dynamic Spectrum Access Networks, 2012 IEEE International Symposium ON, Oct. 16, 2012, pp. 10-20.

McMenamy, et al., "RRH and small cells—The implications for spectrum sharing", 2015 IEEE International Symposium on Dynamic Spectrum Access Networks, Sep. 29, 2015.

* cited by examiner $$\pi_c \geq \delta$$

METHOD AND SYSTEM FOR COMPUTING BANDWIDTH REQUIREMENT IN A CELLULAR NETWORK

FIELD

This invention relates generally to spectrum sharing in cellular networks, and more specifically to a method and system by which a cellular operator can compute bandwidth from shared spectrum in a cellular network.

BACKGROUND

Demand for bandwidth is increasing and frequency bands are becoming more congested, especially in densely populated urban areas. One way to address this problem is to enable spectrum sharing and increase spectrum efficiency through better spectrum management. Diverse approaches to sharing spectrum bands include administrative, technical and market-based considerations.

The last few years have seen major activities and the development of the spectrum-sharing frameworks—in the 3.5 GHz band in the U.S. by the FCC and Licensed Shared Access (LSA) in the 2.3 GHz band in Europe by CEPT. Furthermore, the $3^{rd}$ Partnership Project (3GPP)[1], responsible for specification of the telecommunication/mobile systems, in its Release 13 has introduced License Assisted Access (LAA) feature to enable the operation of Long Term Evolution-Advanced (LTE-Advanced) in the unlicensed, 5 GHz band. These developments can be seen as a clear indication that major regulatory and standardisation bodies are embracing more comprehensive and systematic ways of spectrum sharing.

[1] 3GPP comprises of a number of telecommunications standards development groups and is responsible for specification of the telecommunication network technologies and wireless standards, including radio access, the core transport network, and service capabilities. 3GPP specifications address different generations of mobile systems, from $2^{nd}$ generation—Global System for Mobile Communications (GSM), to $3^{rd}$ generation Universal Mobile Telecommunications System (UMTS) and related technologies, to $4^{th}$ generation-Long Term Evolution (LTE) and LTE-Advanced. Current work is focused on specifying $5^{th}$ generation of mobile systems.

It is also recognised that not all shared spectrum resources will be the same. In some cases, sharing will be restricted in terms of types and the number of entities that are allowed to share spectrum, providing predictability in relation to the Quality of Service (QoS). The examples being licensed spectrum sharing in the 2.3 GHz band in Europe and Priority Access Licensee (PAL) in the 3.5 GHz band in the US. LSA enables the exclusive, shared use of spectrum between the incumbent and a licensed entity (in temporal and spatial domains). LSA, therefore, guarantees the QoS to both—the incumbent and the licensed entity. In the FCC model for spectrum sharing in the 3.5 GHz band, two lower tiers share the spectrum with the incumbent outside the exclusion zones. The incumbent is a top tier in this hierarchy and has a guaranteed protection from the tiers below. The middle tier (PAL) is protected from the interference caused by the third tier, but it has no protection from the transmissions by the incumbents.

In other cases sharing may be open to a number of systems, but without guarantees on the QoS—the example being WiFi® or third, General Authorised Access (GAA) tier in the FCC model.

A number of patent publications exist in the art. For example, patent application US 20150281971 A1 considers dynamic spectrum selection for a cellular network or user equipment, using centralised mechanism, wherein the decision on the shared spectrum selection is based on a most advantageous shared spectrum opportunity. While US 20150281971 A1 is based on cost minimisation, listing also required QoS, efficiency and amount of available spectrum as the selection criteria. PCT patent publication WO 2009/071431 (Ericsson) discloses a method for providing spectrum and infrastructure resources to shared spectrum operators, where the infrastructure resource may be provided using single or multiple base station. Spectrum resources may be allocated using one of the well-known access schemes—time-scheduling scheme, orthogonal frequency division or code division scheme. However, the Ericsson publication does not differentiate between different classes of shared spectrum. Instead, it provides a method for allocating spectrum to shared spectrum operators.

Furthermore, 3GPP Release 13 LTE-Advanced feature LAA incorporates operation in the unlicensed (shared) spectrum, while relying on the operation in the licenced spectrum, using Carrier Aggregation. LAA operation in the unlicensed 5 GHz band can be seen as an instance of a method that enables the operation using one class of shared spectrum, where multiple entities have right to access spectrum. This operation is supported by the operation in dedicated spectrum. However, LAA does not consider other classes of shared spectrum, where an entity has an exclusive right to access spectrum, such as LSA or PAL in the 3.5 GHz band in the US.

In addition to the above, the key technology trends are towards deployments of dense and ultra-dense networks of low power nodes (LPNs). For that reason, of particular interest are two baseband architectures that support such deployments of LPNs. These are the centralised baseband (CBB) architecture and distributed baseband (DBB) architecture. With CBB architecture, all the digital processing is performed centrally, whereas a radio unit that performs RF functions, together with the antenna, is located remotely. The example of CBB architecture are deployments featuring Remote Radio Heads (RRHs). RRHs may be high, or low-power nodes, with the radio unit that is, typically, located remotely. As such, the architecture featuring RRHs pose strict requirements on the throughput, and the acceptable delay and jitter between its radio and baseband units. Considering that digital signal processing functions are centralised, the architecture with RRHs is a predecessor of the Cloud-RAN architecture, allowing for centralised large-scale processing and cloud computing.

In the DBB architecture, each node performs all—baseband and radio functions. Small cells are an example of the DBB architecture. They can be connected to the core network and other radio network nodes using a range of different technologies, such as fibre, xDSL, or wireless.

Both architectures have their pros and cons. The CBB architecture enables pooling of resources, and the implementation of the advanced cooperative schemes that mitigate interference, at the cost of requiring high capacity, low-delay and low-jitter transport network infrastructure. The DBB architecture is a less costly alternative that enables mass deployment of small cells but does not offer all the advantages that come with centralised signal processing.

In view of all of the above, there is a need for a cellular operator to resort to shared spectrum, using different baseband architectures, and specifically to calculate shared spectrum resources required to meet certain QoS.

SUMMARY

The present disclosure provides a method as detailed in claim 1. Also provided is a system according to claim 27. Advantageous features are provided in the dependent claims.

The present disclosure, as set out in the appended claims, provides a mechanism for calculating the required spectrum resources a cellular operator needs to lease from a shared spectrum class to provide a minimum QoS to an end-user. The objective is to minimise the cost to the operator.

In one embodiment there is provided a method of computing a bandwidth requirement for a cellular operator from shared spectrum in a cellular network, the shared spectrum comprising at least one shared spectrum class which is accessible by multiple entities, the method comprising:
computing an average user throughput in the cellular network;
comparing the average user throughput to target, minimum average user throughput, taking into account an average percentage of users within coverage and coverage probability threshold δ; and
based on the comparison, computing an additional bandwidth requirement from the at least one shared spectrum class.

It will be appreciated the invention make use of coverage probability threshold and an average percentage of users within a coverage area of a shared spectrum class that is accessible by multiple entities and based on a comparison an additional bandwidth requirement is computed from the fee paying, exclusively allocated shared spectrum class.

By incorporating dynamic access probability threshold, the cellular operator can determine when the radio conditions in the shared spectrum class that is accessible by multiple entities are suitable to affect the decision on leasing bandwidth from the fee-paying, exclusively allocated shared spectrum. Hence, the mechanism avoids the decision making to be based on too a small number of users that can connect to freely available, shared spectrum. It does this in a dynamic manner and changes with the conditions in the band.

It will be appreciated that the method and system is configured to calculate expected rate/spectral efficiency in the shared bands. Specifically calculations can refer to the case when all users have the capability of receiving on all spectrum bands. Alternatively, the calculations can refer to a portion of users all with the capability to receive on all bands.

It will be further appreciated that the invention makes use of spectrum availability for different classes of shared spectrum which is factored into the computation.

In one embodiment there is provided a system for computing bandwidth requirement for a cellular operator from shared spectrum in a cellular network, the shared spectrum comprising at least one shared spectrum class which is accessible by multiple operators, the system comprising a processor configured to:
compute an average user throughput in the cellular network;
compare the average user throughput to a target minimum average user throughput, taking into account an average percentage of users within coverage and coverage probability threshold δ; and
based on the comparison, compute an additional bandwidth requirement from the at least one shared spectrum class.

The method and system of the present disclosure enable a systematic approach to spectrum sharing but in a more dynamic manner than what is considered by the current models.

There is also provided a computer program comprising program instructions for causing a computer program to carry out the above method which may be embodied on a record medium, carrier signal or read-only memory.

In one embodiment there is provided a method of computing a bandwidth requirement for a cellular operator from shared spectrum in a cellular network, the shared spectrum comprising at least one shared spectrum class which is accessible by multiple entities, the method comprising:
computing an average user throughput in the cellular network;
comparing the average user throughput to a target minimum average user throughput, taking into account a coverage probability threshold δ; and
based on the comparison, computing an additional bandwidth requirement from the at least one shared spectrum class.

The spectrum sharing model considered is based on Carrier Aggregation of LTE Advanced, designed to support topologies with RRHs i.e. centralised baseband, and Dual Connectivity introduced to support deployments with small cells (i.e. distributed baseband). Only the option of Dual Connectivity that does not facilitate inter-node resource allocation is considered herein.

The method refers to two distinct architectures:
a) centralised baseband (CBB)
b) distributed baseband (DBB)

The architecture with RRHs is referred to as the CBB architecture. The architecture with small cells is referred to as the DBB architecture.

In addition, the model also incorporates spectral resources from two distinct shared spectrum classes that are heterogeneous in a number of aspects. They include spectrum access rights, together with the cost of accessing the spectrum, as well as the quality of spectrum in terms of its availability and protection from intersystem interference. A cellular operator determines the required spectrum resources from a particular spectrum class. The objective is to meet a particular QoS, defined as a minimum average user throughput, as specified by a cellular operator.

BRIEF DESCRIPTIONS OF DRAWINGS

The invention will be more clearly understood by the following description of some embodiments thereof, given by way of example only, with reference to the accompanying drawings, in which.

Figure 8A:
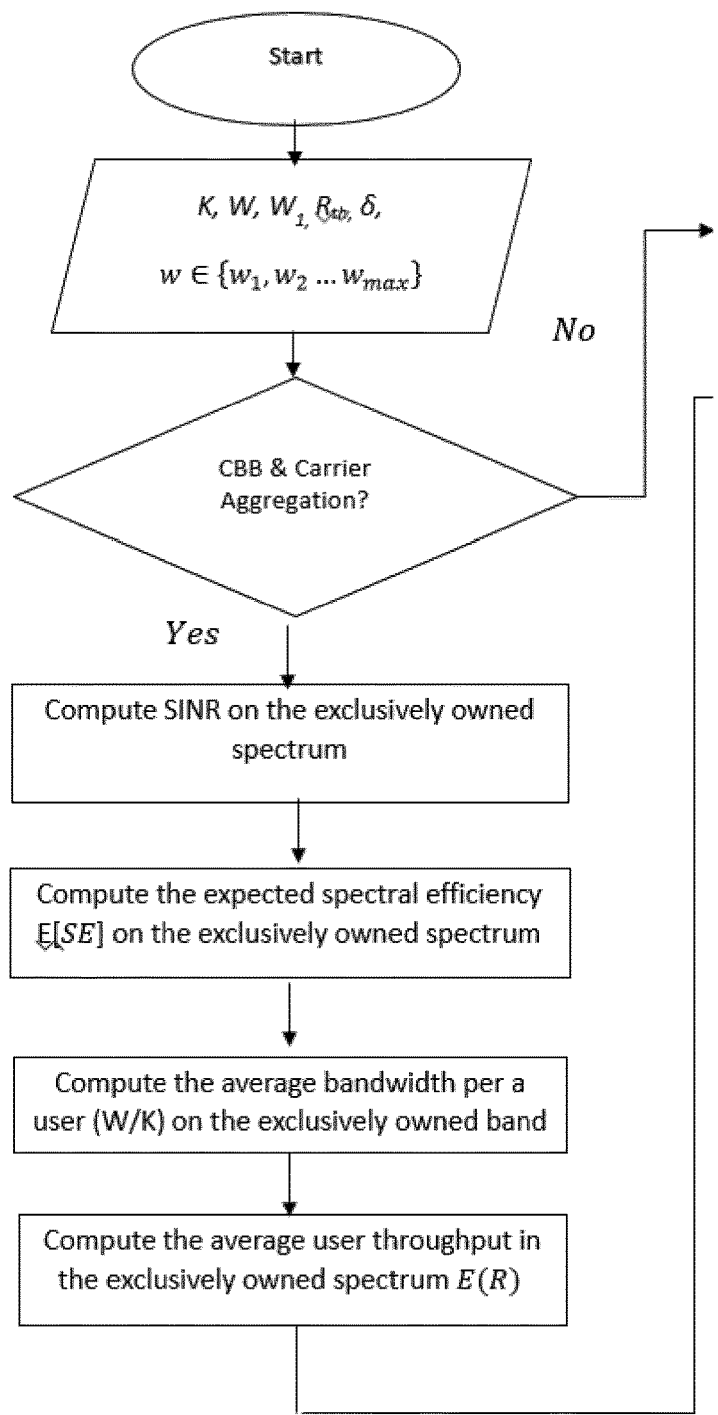
Figure 8B:
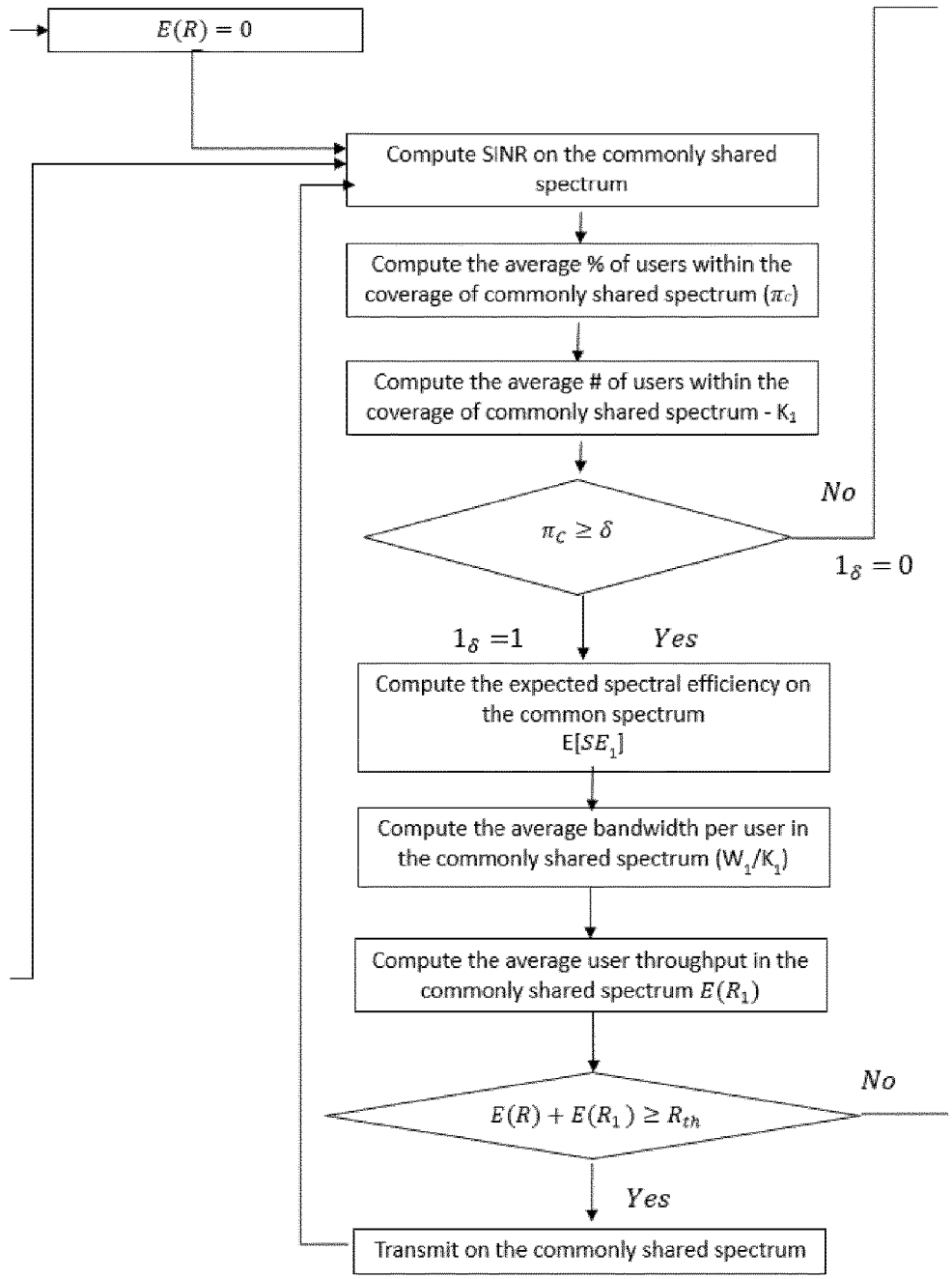
Figure 8C:
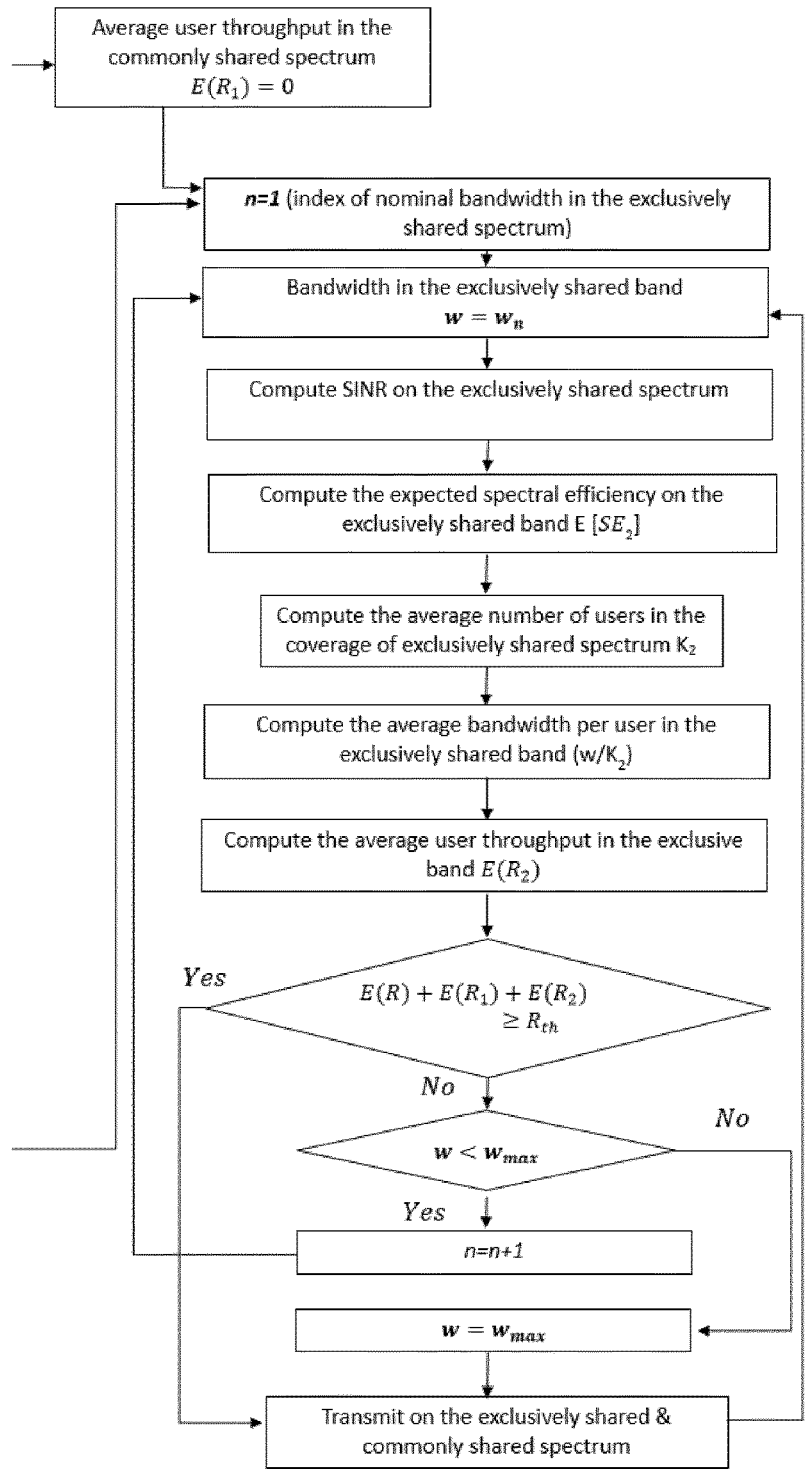
Figure 9:
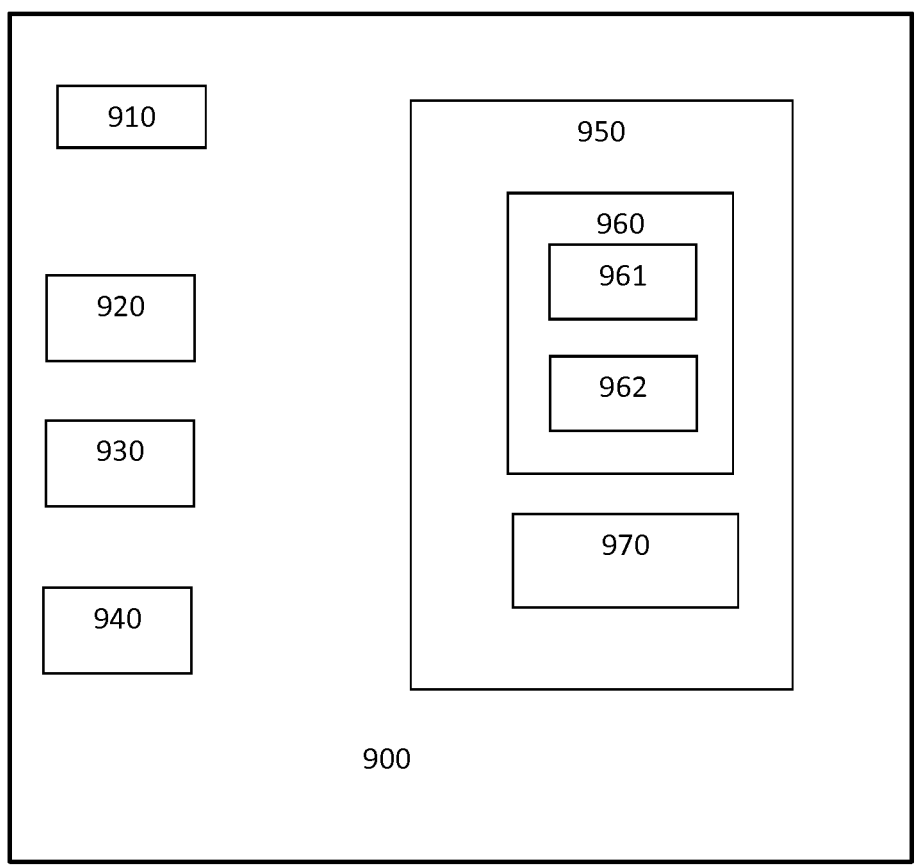

FIGS. 8a to 8c are detailed flowcharts illustrating a method of computing a bandwidth requirement for a cellular operator from shared spectrum in a cellular network, according to an embodiment of the present disclosure; and FIG. 9 is a block diagram illustrating a configuration of a computer system 9 configured to perform the methods disclosed herein, according to an embodiment of the present disclosure.

DETAILED DESCRIPTIONS OF THE DRAWINGS

In the context of the present disclosure, i.e., the field of signal processing, it will be understood that spectrum refers to a spectrum or band of frequencies that can be used for mobile communications. Specifically, bandwidth refers to a range of frequencies—the difference between the upper and lower frequency component—a signal uses on a certain transmission medium. Like the frequency of a signal, bandwidth is measured in hertz (cycles per second). Furthermore, in the context of the present disclosure, throughput is the rate of successful message delivery over a communication channel. The data these messages belong to may be delivered over a physical or logical link, or it can pass through a certain network node. Throughput is usually measured in bits per second (bit/s or bps), and sometimes in data packets per second (p/s or pps) or data packets per time slot.

The present disclosure provides a method and system for computing a bandwidth requirement for a cellular operator from shared spectrum in a cellular network, the shared spectrum comprising at least one shared spectrum class which is accessible by multiple entities, the method comprising: computing an average user throughput in the cellular network; comparing the average user throughput to a target minimum average user throughput, taking into account average percentage of users within coverage and coverage probability threshold δ; and based on the comparison, computing an additional bandwidth requirement from the at least one shared spectrum class.

A base spectrum class may be associated with the cellular operator. The base spectrum class may comprise an exclusively-owned spectrum which is assigned to the cellular operator. The at least one shared spectrum class may comprise a first shared spectrum class and a second shared spectrum class. The first shared spectrum class may comprise a commonly-shared spectrum whereby entities have equal rights in accessing the spectrum. The second shared spectrum class may comprise an exclusively-shared spectrum which can be accessed by a single entity for a specified period of time. The method may comprise computing the additional bandwidth requirement from the exclusively-shared spectrum.

The present disclosure describes a spectrum sharing model that uses spectrum in a three-tier approach, encompassing spectrum blocks that may be far apart, and are of different quality. These spectrum blocks may be referred to as different spectrum classes. Such spectrum classes include an exclusively-owned spectrum class and a shared spectrum class. The exclusively-owned spectrum is assigned to a cellular operator typically on a long-term basis, with the radio resources entirely controlled by the operator. This can be considered as the base spectrum, always available to the operator. Shared spectrum is a spectrum which a cellular operator can access dynamically, on a time-scale of milliseconds, seconds, minutes, or hours.

The shared spectrum class may include two distinct shared spectrum classes—an exclusively-shared class and a commonly-shared class. These differ in a number of aspects, such as availability, access rights, power regime and usage fee. In the exclusively-shared spectrum class, the centralised control of access to spectrum may be managed by a spectrum manager, or spectrum controller. The spectrum availability is normally guaranteed, and the spectrum block is accessed by a single entity, for a specified (short) period of time, typically seconds, minutes, or hours. In this case, a cellular operator has the exclusive access to the spectrum. The access envisages a usage fee while transmission power regime may be high-power.

The commonly-shared spectrum class provides no guarantees on the availability or the interference protection. The spectrum access scheme may entail a central controller that grants access to a specific channel. The entities typically have equal rights in accessing the medium, and the power levels are normally low.

The present disclosure describes a mechanism for calculating required spectrum resources a cellular operator needs to lease from the exclusively-shared spectrum band, or spectrum class, to provide minimum QoS. The objective is to minimise the cost to the operator. This implies that the exclusively-shared spectrum class is resorted to only if target QoS cannot be met by using free, commonly-shared spectrum and the exclusively-owned spectrum in the case of CBB architecture. Considering that such a decision is expected to be made on a much longer time-scale than that of resource scheduling, the QoS target is expressed in terms of a mean user rate (throughput) of an average user. The operator specifies the target QoS.

Figure 1:
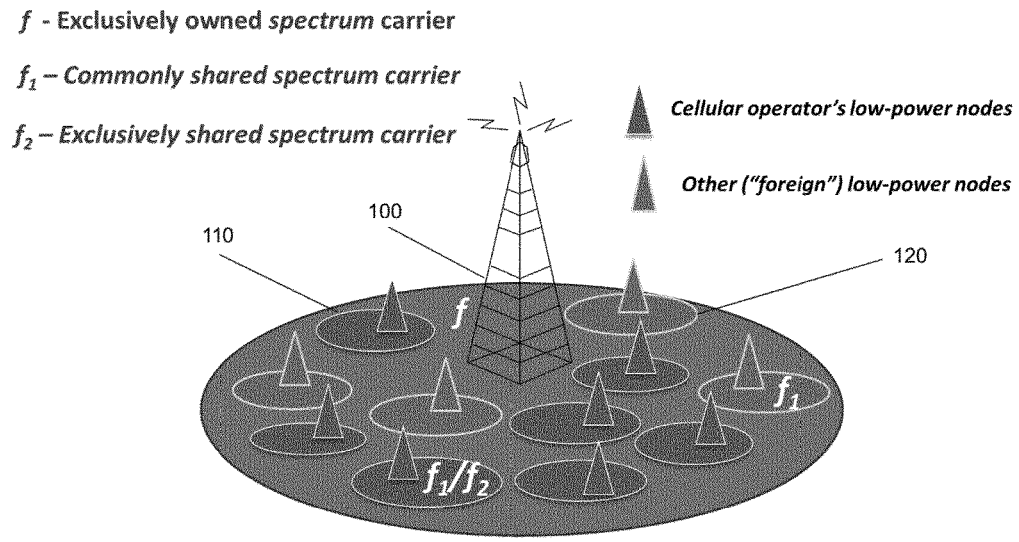
FIG. 1 illustrates a network scenario featuring a macro tier and a tier of LPNs in which the tier of LPNs employs shared spectrum.

The operator can have a macro layer and it may have a different number of LPNs deployed throughout the macro cell area. The LPNs may be RRHs or small cells, or other LPNs that utilise either CBB or DBB architecture. Macro layer and layer of LPNs are referred to as tiers. FIG. 1 illustrates a network scenario featuring a macro tier 100 and a tier of LPNs in which the tier of LPNs employs shared spectrum. The network scenario features a plurality of the cellular operator's own LPNs 110 and a plurality of other or foreign LPNs 120.

As per the spectrum, the exclusively-owned spectrum operates on the macro tier 100 and provides coverage. The exclusively-shared spectrum and commonly-shared spectrum are employed on the tier of LPNs—RRHs, or small cells—as depicted in FIG. 1. Hence, the amount of spectrum resources used at the macro tier 100 is constant. The tier of LPNs can dynamically access additional spectrum resources by using the commonly-shared spectrum class, if available, and/or by leasing the exclusively-shared spectrum. The present disclosure studies the impact each architecture has on the spectrum requirement from the exclusively-shared spectrum class, given the conditions of the commonly-shared spectrum, i.e. its availability and the interference levels.

Figure 2:
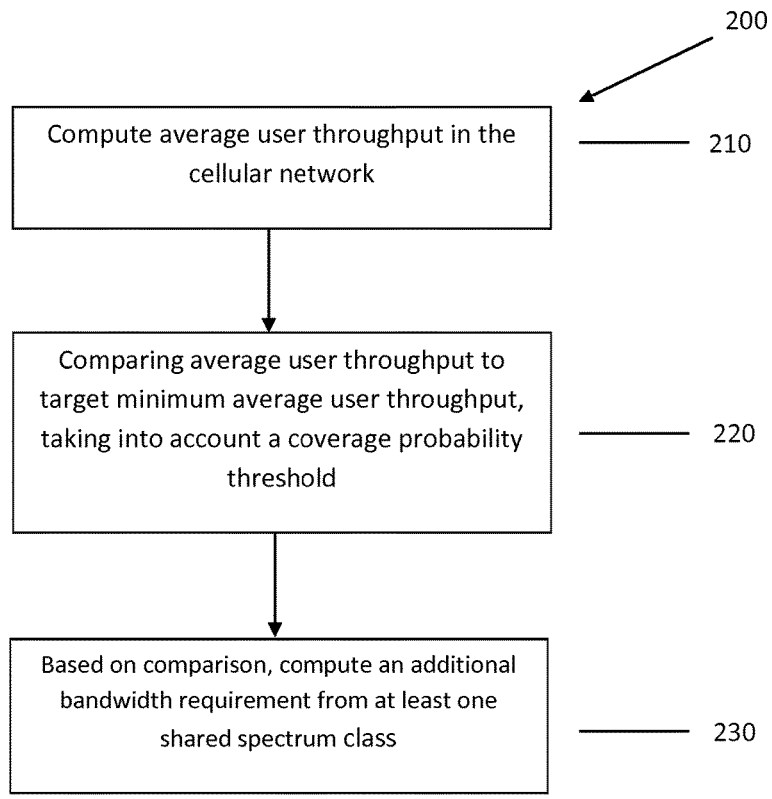
FIG. 2 is a flowchart illustrating a method of computing a bandwidth requirement for a cellular operator from shared spectrum in a cellular network, according to an embodiment of the present disclosure.

To summarise, the disclosure considers: i) macro base stations operating on the exclusively-owned spectrum; ii) a set of LPNs (RRHs or small cells) that employ the shared spectrum FIG. 2 is a diagram illustrating a method 200 of computing bandwidth requirement for a cellular operator from the exclusively-shared spectrum in a cellular network, according to an embodiment of the present disclosure. Referring to FIG. 2, the method 200 includes computing an average user throughput in the cellular network 210, comparing the average user throughput to a target minimum average user throughput, taking into account average percentage of users within coverage of commonly-shared spectrum and coverage probability threshold 220, and based on the comparison, computing an additional bandwidth requirement from the exclusively-shared spectrum class 230.

Figure 3:
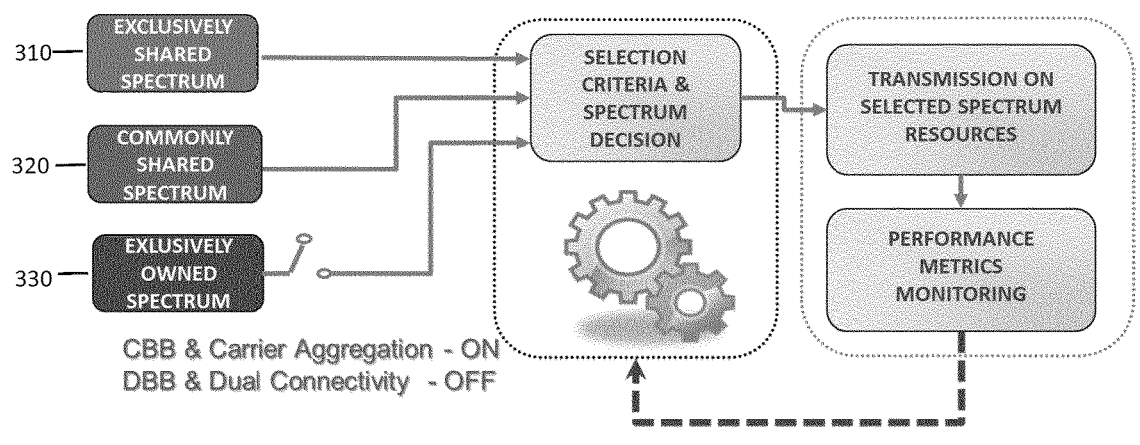
FIG. 3 is a diagram for illustrating a method of computing bandwidth requirement for a cellular operator from shared spectrum in a cellular network, according to an embodiment of the present disclosure.

FIG. 3 is a diagram for illustrating a method of computing bandwidth requirement for a cellular operator from shared spectrum in a cellular network, according to an embodiment of the present disclosure. Referring to FIG. 3, the different spectrum classes include an exclusively-shared spectrum class 310, a commonly-shared spectrum class 320, the operator's exclusively-owned spectrum class 330. The spectrum requirement from the exclusively-shared spectrum class 310 is determined by the throughput an average user achieves by combining the exclusively-owned spectrum class 330 employed by a macro cell and the commonly-shared spectrum class 320 employed by RRHs. For the DBB architecture, the spectrum requirement is solely determined by the throughput achieved by using the commonly-shared spectrum class 320 employed by small cells.

The following describes the mechanism for calculating the required spectrum resources the cellular operator needs to lease from the exclusively-shared spectrum class to provide minimum QoS. The objective is to minimise the cost to the operator. This implies that the operator resorts to the exclusively-shared spectrum only if target QoS cannot be met by using free, commonly-shared spectrum and the exclusively-owned spectrum in the case of CBB architecture. Considering that such a decision is expected to be made on a much longer time-scale than that of resource scheduling, the QoS target is expressed in terms of a mean throughput of an average user. In view of that, the assumption is that the spectral resources are allocated using the simplest form of scheduler i.e. the round-robin scheduler.

The objective can be written as:

$$\min w \qquad (1)$$

where w represents the bandwidth, which the cellular operator can lease for a period of time, i.e., this is the spectrum requirement. In line with the LTE standard, w is an integer decision variable, as spectrum can only be purchased in blocks of certain widths. The minimisation in Eq. (1) is subject to a constraint on the mean throughput from all tiers.

There are three aspects to take into account in defining such a constraint. The first aspect relates to determining the target minimum average user throughput $R_{th}$. $R_{th}$ is predefined by the operator. The second aspect lies in the difference between the two architectures. For the CBB architecture with RRHs, inter-tier spectral resource aggregation is possible. Hence, spectrum requirement from the exclusively-shared spectrum class is determined by the mean throughput an average user achieves by combining the exclusively-owned spectrum employed by a macro cell and commonly-shared spectrum employed by RRHs. For the DBB architecture, spectrum requirement is solely determined by the throughput achieved by using the commonly-shared spectrum employed by small cells, as in this case, the inter-tier spectral resource aggregation is not feasible. Finally, the third aspect that needs to be considered is a difference in coverage between the exclusively and commonly-shared spectrum classes.

A user is considered within a coverage of a cell (macro/small cell/RRH) if their Signal-to-Noise-and-Interference Ratio (SINR) is greater is than a minimum predefined value, determined by the current receiver technologies that decode the signal.

In calculating the required spectrum resources from the exclusively-shared spectrum class, commonly-shared band spectrum resources are considered only if the average percentage of users within coverage of this spectrum class is greater than operator's predefined coverage probability threshold $\delta$. Coverage probability threshold $\delta$ is introduced in order to ensure that when both shared spectrum classes are used, the spectrum decision is based on a sufficient number of users that are within coverage of the commonly-shared spectrum class. Namely, the analysis shows that the exclusively-shared spectrum provides almost full coverage even in the case of low density of LPNs. Hence, there is no requirement for threshold $\delta$ to be applied for the exclusively-shared spectrum class.

In the CBB architecture, hence, the constraint can be written as:

$$1_\delta(\pi_C) \cdot E[R_1] + E[R_2] + E[R] \geq R_{th} \qquad (2)$$

where $E[R_1]$, $E[R_2]$ and $E[R]$ represent the mean throughput of an average user in the commonly-shared spectrum class, exclusively-shared spectrum class and exclusively-owned spectrum class, respectively. $1_\delta(\pi_c)$ is an indicator function, where $\pi_c$ is the percentage of users being able to access the common spectrum class.

$$1_\delta(\pi_C) = \begin{cases} 1 & \text{if } \pi_C \geq \delta \\ 0 & \text{otherwise} \end{cases} \qquad (3)$$

For the DBB architecture, a user can receive data by using the spectrum resources provided either by the exclusively-owned spectrum, or by using the shared spectrum on small cells. Hence, for an average user within coverage of a small cell, the constraint is:

$$1_\delta(\pi_C) \cdot E[R_1] + E[R_2] \geq R_{th} \qquad (4)$$

In order to compute the mean throughput of an average user, the following steps are required: computation of the SINR and the normalised throughput in all relevant spectrum classes; and computation of the average bandwidth per user. The SINR of users in the commonly-shared spectrum class is used to determine $\pi_c$.

The normalised throughput may be calculated using the Shannon formulae, as would be known by those skilled in the art. Similarly, the SINR may be calculated using any suitable method.

For the CBB architecture, the expected throughput of an average user is the sum of the expected throughputs using the exclusively-owned spectrum on the macro tier and shared spectrum on the RRH tier. The constraint in (3) can be written as:

$$1_\delta(\pi_C) \cdot \frac{W_1}{K_1} \cdot E[S_1] + \frac{w}{K_2} \cdot E[S_2] + \frac{W}{K} \cdot E[S] \geq R_{th} \quad (5)$$

where W and $W_1$ is the channel bandwidth in the exclusively-owned spectrum and commonly-shared spectrum, respectively; w is the channel bandwidth in the exclusively-shared spectrum, that is the spectrum requirement; K is the number of users in a macro cell, $K_1$ and $K_2$, is the average number of users that can access the commonly-shared and the exclusively-shared spectrum class, respectively; E[S], $E[S_1]$ and $E[S_2]$ is the mean normalised throughput of an average user in a macro cell, in the commonly-shared spectrum class and in the exclusively-shared spectrum class; $R_{th}$, is target minimum average user throughput.

For the CBB architecture, the method comprises, when $1_\delta(\pi_C)=1$, determining the minimum value of w such that the sum of the average user throughputs in the second shared spectrum class, the base spectrum class and the first shared spectrum class is greater or equal to the target minimum average user throughput.

For the CBB architecture, the method comprises, when $1_\delta(\pi_C)=0$, determining the minimum value of w such that the sum of the average user throughputs in the second shared spectrum class and the base spectrum class is greater or equal to the target minimum average user throughput.

Figure 4:
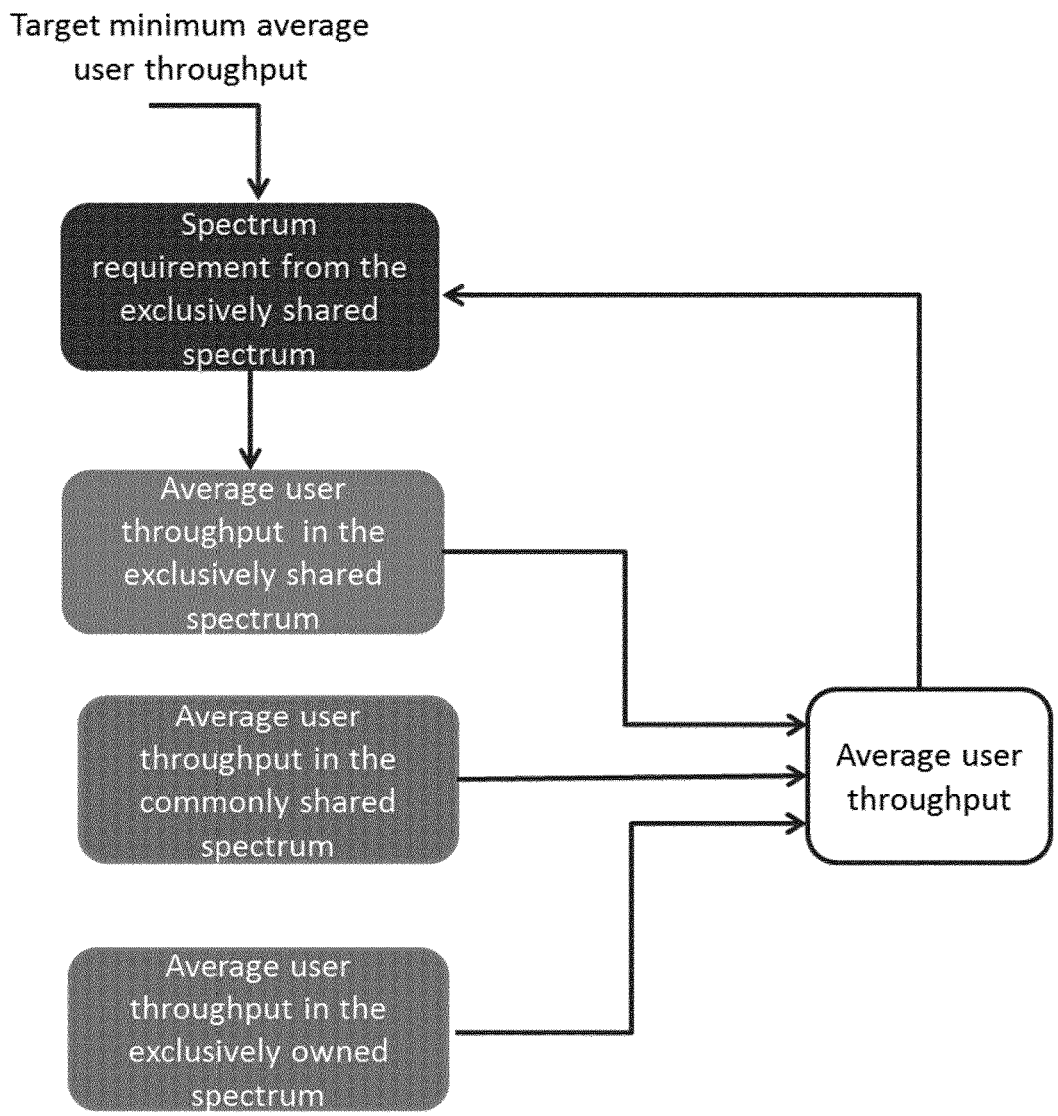
FIG. 4 is a diagram illustrating a method of computing bandwidth requirement in a centralised baseband architecture where the average percentage of users that are within the coverage of a first shared spectrum is greater than or equal to an operator-defined coverage probability threshold, according to an embodiment of the present disclosure.
Figure 5:
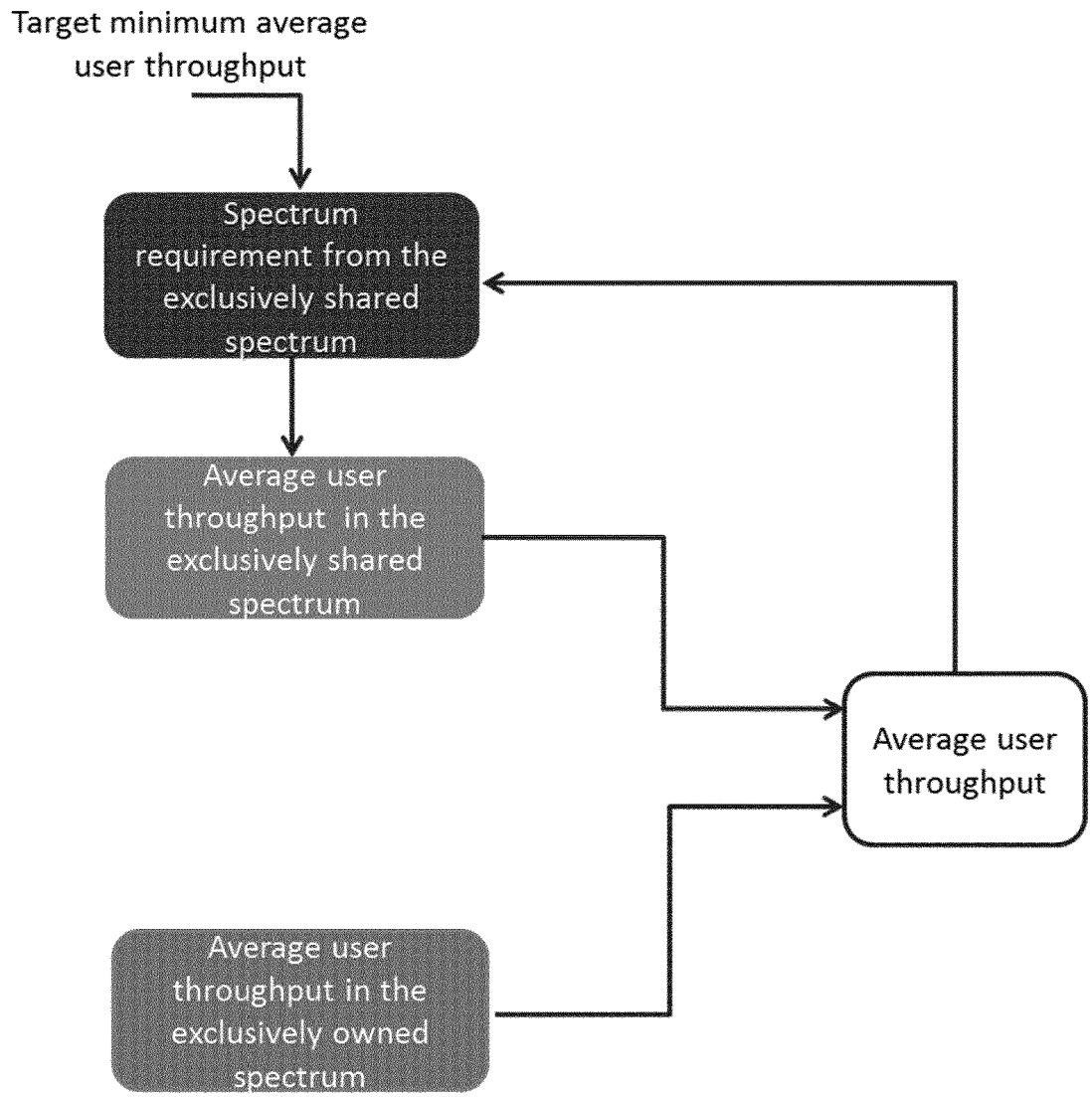
FIG. 5 is a diagram illustrating a method of computing bandwidth requirement in a centralised baseband architecture where the average percentage of users that are within the coverage of the first shared spectrum is less than the coverage probability threshold, according to an embodiment of the present disclosure.

FIG. 4 is a diagram illustrating a method of computing bandwidth requirement in the CBB architecture where the average percentage of users that are within coverage of the first shared spectrum is greater than or equal to coverage probability threshold δ, according to an embodiment of the present disclosure. FIG. 5 is a diagram illustrating a method of computing bandwidth requirement in the CBB architecture where the average percentage of users that are within the coverage of the first shared spectrum is less than coverage probability threshold δ, according to an embodiment of the present disclosure.

For the DBB architecture, the user throughput can only be provided either by the macro tier, or the tier of small cells. Hence, for an average user within coverage of a small cell, the constraint in (4) can be written as:

$$1_\delta(\pi_C) \cdot \frac{W_1}{K_1} \cdot E[S_1] + \frac{w}{K_2} \cdot E[S_2] \geq R_{th} \quad (6)$$

The terms under the expectation in (5) and (6) represent the normalised throughput in each of the considered spectrum classes, computed over the spatial domain.

For the DBB architecture, the method comprises, when $1_\delta(\pi_C)=1$, determining the minimum value of w such that the sum of the average user throughputs in the second shared spectrum class and the first shared spectrum class is greater or equal to the target minimum average user throughput.

For the DBB architecture, the method comprises, when $1_\delta(\pi_C)=0$, determining the minimum value of w such that the average user throughput in the second shared spectrum class is greater or equal to the target minimum average user throughput.

Figure 6:
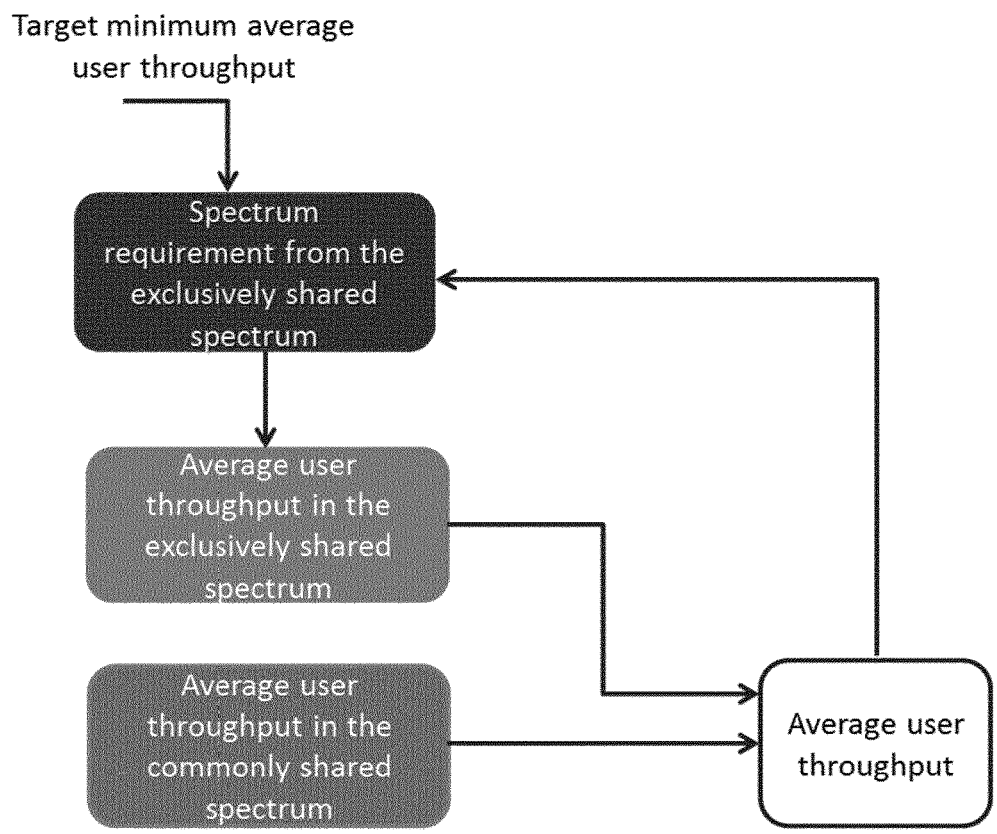
FIG. 6 is a diagram illustrating a method of computing bandwidth requirement in a distributed baseband architecture where the average percentage of users that are within the coverage of the first shared spectrum is greater than or equal to the coverage probability threshold, according to an embodiment of the present disclosure.
Figure 7:
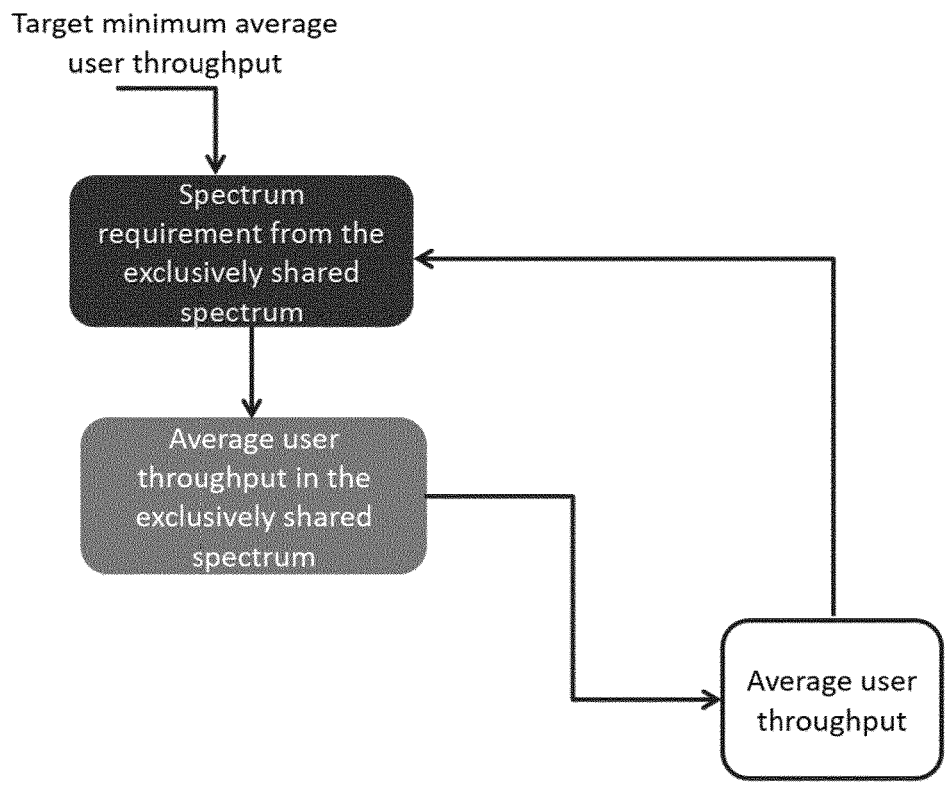
FIG. 7 is a diagram illustrating a method of computing bandwidth requirement in a distributed baseband architecture where the average percentage of users that are within the coverage of the first shared spectrum is less than the coverage probability threshold, according to an embodiment of the present disclosure.

FIG. 6 is a diagram illustrating a method of computing bandwidth requirement in the DBB architecture where the average percentage of users that are within the coverage of the first shared spectrum is greater than or equal to coverage probability threshold δ, according to an embodiment of the present disclosure. FIG. 7 is a diagram illustrating a method of computing bandwidth requirement in a distributed baseband architecture where the average percentage of users that are within coverage of the first shared spectrum is less than coverage probability threshold δ, according to an embodiment of the present disclosure.

FIGS. 8a to 8c are detailed flowcharts illustrating a method of computing a bandwidth requirement for a cellular operator from shared spectrum in a cellular network, according to an embodiment of the present disclosure. It will be understood by the skilled person that the flowcharts of FIGS. 8a to 8c are to be combined into one overall flowchart representing the methodology of the present disclosure. That is, FIG. 8a leads on to FIG. 8b which in turn leads on to FIG. 8c. Referring to FIG. 8c, $w_n$ cannot exceed the maximum bandwidth that can be leased from the exclusively-shared spectrum.

The present disclosure also provides a system for computing bandwidth requirement for a cellular operator from shared spectrum in a cellular network, the shared spectrum comprising at least one shared spectrum class which is accessible by multiple operators, the system comprising a processor configured to: compute an average user throughput in the cellular network; compare the average user throughput to a target minimum average user throughput, taking into account average percentage of users within coverage and coverage probability threshold δ; and based on the comparison, compute the additional bandwidth requirement from the at least one shared spectrum class.

The processor may be configured to perform any of the above-described method steps. The system may be associated with the network operator.

FIG. 9 is a block diagram illustrating a configuration of a computer system 900 configured to perform the methods disclosed herein, according to an embodiment of the present disclosure. The computer system 900 includes various hardware and software components that function to perform the methods according to the present disclosure. Referring to FIG. 9, the computer system 900 comprises a user interface 910, a processor 920 in communication with a memory 950, and a communication interface 930. The processor 920 functions to execute software instructions that can be loaded and stored in the memory 950. The processor 920 may include a number of processors, a multi-processor core, or some other type of processor, depending on the particular implementation. The memory 950 may be accessible by the processor 920, thereby enabling the processor 920 to receive and execute instructions stored on the memory 950. The memory 950 may be, for example, a random access memory (RAM) or any other suitable volatile or non-volatile computer readable storage medium. In addition, the memory 950 may be fixed or removable and may contain one or more components or devices such as a hard drive, a flash memory, a rewritable optical disk, a rewritable magnetic tape, or some combination of the above.

One or more software modules 960 may be encoded in the memory 950. The software modules 960 may comprise one or more software programs or applications 961 and 962 having computer program code or a set of instructions configured to be executed by the processor 920. Such computer program code or instructions for carrying out operations for aspects of the systems and methods disclosed herein may be written in any combination of one or more programming languages.

Other information and/or data relevant to the operation of the present system and methods, such as a database 970, may also be stored in the memory 950. The database 970 may contain and/or maintain various data items and elements that are utilized throughout the various operations of the method and system described above.

The impact on the spectrum sharing model of two distinct baseband architectures—the centralised baseband (CBB) architecture, featuring RRHs, and the distributed baseband (DBB) architecture, featuring small cells, has been considered in the present disclosure. The model is based on Carrier Aggregation and Dual Connectivity of LTE-Advanced, with two tiers. Dual Connectivity is a feature introduced in 3GPP Release 12 to enable a user's simultaneous connection to two radio network nodes. It is designed to support densification of cellular networks using small cells and DBB architecture, over a range of transport network technologies. Only the option of Dual Connectivity which does not facilitate inter-node resource allocation is considered herein. The tier of macro cells provides coverage and the required connectivity to the core network, while the tier of LPNs provides additional capacity to hotspot areas. As per the spectrum, three distinct spectrum classes are envisaged—the cellular operator's own spectrum and two shared spectrum classes. The exclusively-shared spectrum provides guarantees on the availability and interference protection, but at a usage fee. Commonly-shared spectrum does not provide guarantees in terms of availability, permitted power levels, or interference protection. It allows equal and simultaneous access to the medium to a number of entities. The mean throughput of an average user within coverage of RRHs or small cells is analysed. The objective is to determine minimum spectrum requirement from the exclusively-shared spectrum to meet the target, minimum average user throughput. In this way, the cost to the cellular operator is minimised with the aim to meet the QoS requirements. Furthermore, coverage probability threshold δ ensures that the spectrum decision is based on a balanced number of users that are within coverage of both shared spectrum classes, regardless of the conditions in the commonly-shared spectrum.

The words comprises/comprising when used in this specification are to specify the presence of stated features, integers, steps or components but does not preclude the presence or addition of one or more other features, integers, steps, components or groups thereof.

The invention is not limited to the embodiment(s) described herein but can be amended or modified without departing from the scope of the present invention.

What is claimed is:

1. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:
   computing an average user throughput in the cellular network;
   comparing the average user throughput to target, minimum average user throughput, taking into account an average percentage of users within coverage and coverage probability threshold δ;
   based on the comparison, computing an additional bandwidth requirement from the at least one shared spectrum class; and,
   computing if the average percentage of users that are within coverage of a first shared spectrum class of the at least one shared spectrum class is greater than or equal to the coverage probability threshold δ.

2. The method of claim 1, wherein a base spectrum class is associated with the cellular operator.

3. The method of claim 1, wherein a base spectrum class comprises an exclusively-owned spectrum which is assigned to the cellular operator.

4. The method of claim 1, wherein the at least one shared spectrum class comprises a second shared spectrum class.

5. The method of claim 1, wherein the first shared spectrum class comprises a commonly-shared spectrum whereby entities have equal rights in accessing the spectrum.

6. The method of claim 1, wherein the at least one shared spectrum class comprises a second shared spectrum class that comprises an exclusively-shared spectrum accessed by a single entity for a specified period of time.

7. The method of claim 1, further comprising, based on the comparison, computing the additional bandwidth requirement from an exclusively-shared spectrum.

8. The method of claim 1, wherein the average user throughput is obtained by: computing a signal-to-noise-and-interference ratio (SINR), a normalized throughput, and an average bandwidth per user in relevant spectrum classes, wherein the additional bandwidth requirement is minimized, subject to meeting a target minimum average user throughput.

9. The method of claim 1, wherein the computing the average user throughput comprises computing an average user throughput in a base spectrum class and the at least one shared spectrum class.

10. The method of claim 1, further comprising, if the average percentage of users that are within coverage of the first shared spectrum class is greater than or equal to the coverage probability threshold δ, computing the average user throughput in the first shared spectrum class and in a base spectrum class.

11. The method of claim 1, further comprising, if the average percentage of users that are within coverage of the first shared spectrum is less than the coverage probability threshold δ, computing the average user throughput in a base spectrum class.

12. The method of claim 1, wherein the comparison in the centralized baseband (CBB) architecture is:

$$1_\delta(\pi_C) \cdot E[R_1] + E[R_2] + E[R] \geq R_{th}$$

where E[R1], E[R2] and E[R] represent a mean throughput of an average user in the first shared spectrum class, a second shared spectrum class of the at least one shared spectrum class and a base spectrum class, respectively, $1_\delta(\pi_c)$ is an indicator function, where $\pi_c$ is the average percentage of users within coverage of the first shared spectrum class, and $R_{th}$ is the target, minimum average user throughput, wherein $1_\delta(\pi_c)=1$ if $\pi_c \geq \delta$, and 0 otherwise.

13. The method of claim 1, wherein the comparison in the centralized baseband (CBB) architecture is:

$$1_\delta(\pi_C) \cdot \frac{W_1}{K_1} \cdot E[S_1] + \frac{w}{K_2} \cdot E[S_2] + \frac{W}{K} \cdot E[S] \geq R_{th}$$

where W and $W_1$ are a channel bandwidth in a base spectrum class and the first shared spectrum class of the at least one shared spectrum class, respectively; w is a channel bandwidth in a second shared spectrum class of the at least one shared spectrum class, that is a spectrum requirement; K is a of users in a macro cell, $K_1$ and $K_2$ are average number of users that access the first and second shared spectrum classes, respectively; $E[S_1]$, $E[S_2]$ and $E[S]$, are mean normalized throughputs of an average user in a macro cell, in the first and second shared spectrum classes and the base spectrum class, respectively; and $R_{th}$ is the minimum target average user throughput.

14. The method of claim 13, when $1_\delta (\pi_C)=1$, further comprising determining a minimum value of w such that a sum of the average user throughputs in the second shared spectrum class, the base spectrum class and the first shared spectrum class is greater or equal to the target, minimum average user throughput; or when $1_\delta (\pi_C)=0$, comprising determining the minimum value of w such that the sum of the average user throughputs in the second shared spectrum class and the base spectrum class is greater or equal to the target minimum average user throughput.

15. The method of claim 1, further comprising, if the average percentage of users that are within coverage of the first shared spectrum class is greater than or equal to the coverage probability threshold δ, computing the average user throughputs in the first shared spectrum class and a second shared spectrum class of the at least one shared spectrum class.

16. The method of claim 1, further comprising, if the average percentage of users that are within coverage of the first shared spectrum class is less than the coverage probability threshold δ, computing the average user throughput in a second shared spectrum class of the at least one shared spectrum class.

17. The method of claim 1, wherein the comparison in the distributed baseband (DBB) architecture is:

$$1_\delta(\pi_C) \cdot E[R_1] + E[R_2] \geq R_{th}$$

where $E[R1]$, and $E[R2]$ represent a mean throughput of an average user in the first shared spectrum class and a second shared spectrum class of the at least one shared spectrum class, respectively, $1_\delta (\pi_c)$ is an indicator function, where $\pi_c$ is a percentage of users able to access the first shared spectrum class, and $R_{th}$ is the minimum, target average user throughput, wherein $1_\delta (\pi_c)=1$ if $\pi_c \geq \delta$, and 0 otherwise.

18. The method of claim 1, wherein the comparison in the distributed baseband (DBB) architecture is:

$$1_\delta(\pi_C) \cdot \frac{W_1}{K_1} \cdot E[S_1] + \frac{w}{K_2} \cdot E[S_2] \geq R_{th}$$

where $W_1$ is a channel bandwidth in the first shared spectrum class, w is a channel bandwidth in a second shared spectrum class of the at least one shared spectrum class, that is a spectrum requirement; K is a number of users in a macro cell, $K_1$ and $K_2$ are average number of users that access the first and second shared spectrum classes, respectively; $E[S_1]$, and $E[S_2]$ are mean normalized throughputs of an average user in a macro cell, in the first and second shared spectrum classes, respectively; and $R_{th}$ is the target minimum average user throughput.

19. The method of claim 18, when $1_\delta (\pi_C)=1$, further comprising determining a minimum value of w such that a sum of the average user throughputs in the second shared spectrum class and the first shared spectrum class is greater or equal to the target, minimum average user throughput; or when $1_\delta (\pi_C)=0$, comprising determining the minimum value of w such that the average user throughput in the second shared spectrum class is greater or equal to the target, minimum average user throughput.

20. The method of claim 1, wherein a user is considered to be within a coverage of a cell if a Signal-to-Noise-and-Interference Ratio (SINR) of the user is greater than a minimum predefined value, determined by receiver technologies that decode the signal.

21. A system for computing bandwidth requirement for a cellular operator from shared spectrum in a cellular network, the shared spectrum comprising at least one shared spectrum class which is accessible by multiple operators, the system comprising a processor configured to:

compute an average user throughput in the cellular network;

compare the average user throughput to a target minimum average user throughput, taking into account an average percentage of users within coverage and coverage probability threshold δ;

based on the comparison, compute an additional bandwidth requirement from the at least one shared spectrum class; and computing if the average percentage of users that are within coverage of a first shared spectrum class of the at least one shared spectrum class is greater than or equal to the coverage probability threshold δ.

22. The system of claim 21, wherein said system is associated with a network operator.

23. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:

computing an average user throughput in the cellular network;

comparing the average user throughput to target, minimum average user throughput, taking into account an average percentage of users within coverage and coverage probability threshold δ; and, based on the comparison, computing an additional bandwidth requirement from the at least one shared spectrum class, wherein the comparison in the centralized baseband (CBB) architecture is:

$$1_\delta(\pi_C) \cdot E[R_1] + E[R_2] + E[R] \geq R_{th}$$

where $E[R1]$, $E[R2]$ and $E[R]$ represent a mean throughput of an average user in a first shared spectrum class of the at least one shared spectrum class, a second shared spectrum class of the at least one shared spectrum class and a base spectrum class, respectively, $1_\delta (\pi_c)$ is an indicator function, where $\pi_c$ is the average percentage of users within coverage of the first shared spectrum class, and $R_{th}$ is the target, minimum average user throughput, wherein $1_\delta (\pi_c)=1$ if $\pi_c \geq \delta$, and 0 otherwise.

24. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:

computing an average user throughput in the cellular network;

comparing the average user throughput to target, minimum average user throughput, taking into account an average percentage of users within coverage and coverage probability threshold δ; and, based on the comparison, computing an additional bandwidth requirement from the at least one shared spectrum class, wherein the comparison in the centralized baseband (CBB) architecture is:

$$1_\delta(\pi_C) \cdot \frac{W_1}{K_1} \cdot E[S_1] + \frac{w}{K_2} \cdot E[S_2] + \frac{W}{K} \cdot E[S] \geq R_{th}$$

where W and $W_1$ are a channel bandwidth in a base spectrum class and a first shared spectrum class of the at least one shared spectrum class, respectively; w is a channel bandwidth in a second shared spectrum class of the at least one shared spectrum class, that is a spectrum requirement; K is a of users in a macro cell, $K_1$ and $K_2$ are average number of users that access the first and second shared spectrum classes, respectively; $E[S_1]$, $E[S_2]$ and $E[S]$, are mean normalized throughputs of an average user in a macro cell, in the first and second shared spectrum classes and the base spectrum class, respectively; and $R_{th}$ is the minimum target average user throughput.

25. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:

computing an average user throughput in the cellular network;

comparing the average user throughput to target, minimum average user throughput, taking into account an average percentage of users within coverage and coverage probability threshold δ;

based on the comparison, computing an additional bandwidth requirement from the at least one shared spectrum class; and, if the average percentage of users that are within coverage of a first shared spectrum class of the at least one shared spectrum class is greater than or equal to the coverage probability threshold δ, computing the average user throughputs in the first shared spectrum class and a second shared spectrum class of the at least one shared spectrum class.

26. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:

computing an average user throughput in the cellular network;

comparing the average user throughput to target, minimum average user throughput, taking into account an average percentage of users within coverage and coverage probability threshold δ;

based on the comparison, computing an additional bandwidth requirement from the at least one shared spectrum class; and, if the average percentage of users that are within coverage of a first shared spectrum class of the at least one shared spectrum class is less than the coverage probability threshold δ, computing the average user throughput in a second shared spectrum class of the at least one shared spectrum class.

27. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:

computing an average user throughput in the cellular network;

comparing the average user throughput to target, minimum average user throughput, taking into account an average percentage of users within coverage and coverage probability threshold δ; and, based on the comparison, computing an additional bandwidth requirement from the at least one shared spectrum class, wherein the comparison in the distributed baseband (DBB) architecture is:

$$1_\delta(\pi_C) \cdot E[R_1] + E[R_2] \geq R_{th}$$

where E[R1], and E[R2] represent a mean throughput of an average user in a first shared spectrum class and a second shared spectrum class of the at least one shared spectrum class, respectively, $1_\delta(\pi_c)$ is an indicator function, where $\pi_c$ is a percentage of users able to access the first shared spectrum class, and $R_{th}$ is the minimum, target average user throughput, wherein $1_\delta(\pi_c)=1$ if $\pi_c \geq \delta$, and 0 otherwise.

28. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:

computing an average user throughput in the cellular network;

comparing the average user throughput to target, minimum average user throughput, taking into account an average percentage of users within coverage and coverage probability threshold δ; and, based on the comparison, computing an additional bandwidth requirement from the at least one shared spectrum class, wherein the comparison in the distributed baseband (DBB) architecture is:

$$1_\delta(\pi_C) \cdot \frac{W_1}{K_1} \cdot E[S_1] + \frac{w}{K_2} \cdot E[S_2] + \frac{W}{K} \cdot E[S] \geq R_{th}$$

where $W_1$ is a channel bandwidth a the first shared spectrum class of the at least one shared spectrum class, w is a channel bandwidth in a second shared spectrum class of the at least one shared spectrum class, that is a spectrum requirement; K is a number of users in a macro cell, $K_1$ and $K_2$ are average number of users that access the first and second shared spectrum classes, respectively; $E[S_1]$, and $E[S_2]$ are mean normalized throughputs of an average user in a macro cell, in the first and second shared spectrum classes, respectively; and $R_{th}$ is the target minimum average user throughput.

29. A method of computing a bandwidth requirement for a cellular operator from shared spectrum in a cellular network, wherein the cellular network comprises a centralized baseband (CBB) architecture or a distributed baseband architecture (DBB), the shared spectrum comprising at least one shared spectrum class which is accessible by multiple entities, the method comprising:

computing an average user throughput in the cellular network;

comparing the average user throughput to target, minimum average user throughput, taking into account an average percentage of users within coverage and coverage probability threshold δ; and, based on the comparison, computing an additional bandwidth requirement from the at least one shared spectrum class, wherein a user is considered to be within a coverage of a cell if a Signal-to-Noise-and-Interference Ratio (SINR) of the user is greater than a minimum predefined value, determined by receiver technologies that decode the signal.

* * * * *